(12) United States Patent
Takahashi et al.

(10) Patent No.: US 10,888,991 B2
(45) Date of Patent: Jan. 12, 2021

(54) MOBILE ROBOT

(71) Applicant: DENSO WAVE INCORPORATED, Aichi-pref. (JP)

(72) Inventors: Yoshinori Takahashi, Chita-gun (JP); Shigeru Takeda, Chita-gun (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 302 days.

(21) Appl. No.: 16/130,167

(22) Filed: Sep. 13, 2018

(65) Prior Publication Data

US 2019/0091851 A1 Mar. 28, 2019

(30) Foreign Application Priority Data

Sep. 22, 2017 (JP) .................. 2017-182698

(51) Int. Cl.
| | |
|---|---|
| *B25J 5/00* | (2006.01) |
| *B25J 9/04* | (2006.01) |
| *B25J 9/16* | (2006.01) |
| *B25J 9/08* | (2006.01) |
| *B25J 5/04* | (2006.01) |

(52) U.S. Cl.
CPC ............... *B25J 5/007* (2013.01); *B25J 5/04* (2013.01); *B25J 9/042* (2013.01); *B25J 9/08* (2013.01); *B25J 9/162* (2013.01)

(58) Field of Classification Search
CPC ..... B25J 5/02; B25J 9/084; B25J 9/003; B25J 9/107; B25J 9/042; B25J 9/043; B25J 9/044; B25J 5/007; B65G 65/00; B65G 65/08; H01L 21/67796; H01L 21/68764; H01L 21/68771; H01L 21/68785
See application file for complete search history.

(56) References Cited

U.S. PATENT DOCUMENTS

| | | | | |
|---|---|---|---|---|
| 10,737,817 | B2* | 8/2020 | Rogers | ............ B25J 9/042 |
| 2006/0078408 | A1* | 4/2006 | Chang | ............ H01J 9/46 |
| | | | | 414/281 |
| 2006/0216137 | A1* | 9/2006 | Sakata | ............ H01L 21/67766 |
| | | | | 414/222.13 |
| 2014/0112742 | A1* | 4/2014 | Yang | ............ B25J 9/044 |
| | | | | 414/222.13 |

FOREIGN PATENT DOCUMENTS

| | | |
|---|---|---|
| JP | 2003-341450 A | 12/2003 |
| JP | 2003-341834 A | 12/2003 |
| JP | 2018-034256 A | 3/2018 |
| JP | 2018034256 A * | 3/2018 |

* cited by examiner

*Primary Examiner* — Gerald McClain

(74) *Attorney, Agent, or Firm* — Harness, Dickey & Pierce, P.L.C.

(57) ABSTRACT

A mobile robot includes an electric device unit disposed inside a cover and upward of a robot, and a transport mechanism disposed downward of the robot. An end part of a rotation shaft of a motor driving an arm portion of the robot faces downward. The cover includes a partition plate separating a first housing space in which the electric device unit is housed and a second housing space in which the robot is housed. The partition plate has a protrusion protruding into the first housing space. The protrusion provides a motor housing space in the second housing space. At least one part of the first motor is housed in the motor housing space when a base of the robot is elevated to an uppermost position.

3 Claims, 17 Drawing Sheets

MOBILE ROBOT

CROSS REFERENCE TO RELATED APPLICATION

This application is based on and incorporates herein by reference Japanese Patent Application No. 2017482698 filed on Sep. 22, 2017.

TECHNICAL FIELD

The present disclosure relates to a mobile robot.

BACKGROUND

Conventionally, a production system using a robot has been considered for a factory facility, for example, for the purpose of production (assembling) of automobile parts. For such production system, Patent Documents (JP 2003-341450 A and JP 2003-341834 A) disclose a configuration using a mobile robot in which a vertical articulated robot is mounted on an automated guided vehicle. According to the above configuration, a traveling path of the mobile robot is provided on a floor of a factory. The mobile robot performs an operation process in multiple process areas (work facilities) while being freely moved along the traveling path.

SUMMARY

As the above-described production system, for example, since it is constructed in a limited space in the factory, it is preferable that it be as compact as possible. Therefore, even for a mobile robot, it is better to keep the dimension in the height direction small. In addition, in a processing line, which is one of main uses of the production system, the mobile robot is used in an environment in which cutting oil or the like may adhere to the mobile robot. Therefore, it is better for robots (motors, electric parts, etc.) constituting the mobile robot to satisfy specifications that do not cause malfunction by cutting oil, i.e. drip-proof specifications.

An object of the present disclosure is to provide a mobile robot capable of reducing a size in a height direction while realizing drip-proofness.

According to an aspect of the present disclosure, a mobile robot includes a linear motion shaft, a movable body, a robot, a cover, an electric device unit, a transport mechanism, and an elevating mechanism. The linear motion shaft extends in an arrangement direction of process areas, and the movable body is linearly movable in a horizontal direction along the linear motion shaft. The robot includes: a base attached to the movable body and being movable in a vertical direction with respect to the movable body; a first arm having a proximal end part which is rotatable about a first vertical shaft and coupled to the base; and a first motor configured to generate a driving force to drive the first vertical shaft. The cover houses the robot therein and has an opening that faces the process areas. The electric device unit has electric components. The transport mechanism is configured to linearly move the movable body. The elevating mechanism is configured to perform an elevating operation to move the base in the vertical direction. The robot is housed in the cover during moving between the process areas, and performs, in front of the process areas, a predetermined operation including an action to move an arm end toward the process areas through the opening. The electric device unit is disposed inside the cover and upward of the robot in the vertical direction. The transport mechanism is disposed downward of the robot in the vertical direction. The first motor is arranged such that an end part of a rotation shaft of the first motor faces downward in the vertical direction. The cover includes a partition plate separating a first housing space in which the electric device unit is housed and a second housing space in which the robot is housed. The partition plate has a protrusion protruding in a direction from the second housing space toward the first housing space. The protrusion provides a motor housing space in the second housing space, the motor housing space being capable of housing therein at least one part of the first motor. The at least one part of the first motor is housed in the motor housing space when the base is moved to an uppermost position in the vertical direction by the elevating operation.

The mobile robot of the above-described configuration is capable of reducing size in the height direction while realizing drip-proofness. Therefore, when the production system is configured using such mobile robot, the size thereof can be reduced. In addition, the mobile robot having the above configuration can be used in an environment requiring drip-proof specifications, for example, an environment where there is a possibility of cutting oil adhering to the mobile robot.

DETAILED DESCRIPTION

Hereinafter, an embodiment of the present disclosure will be described with reference to the drawings.

Figure 1:
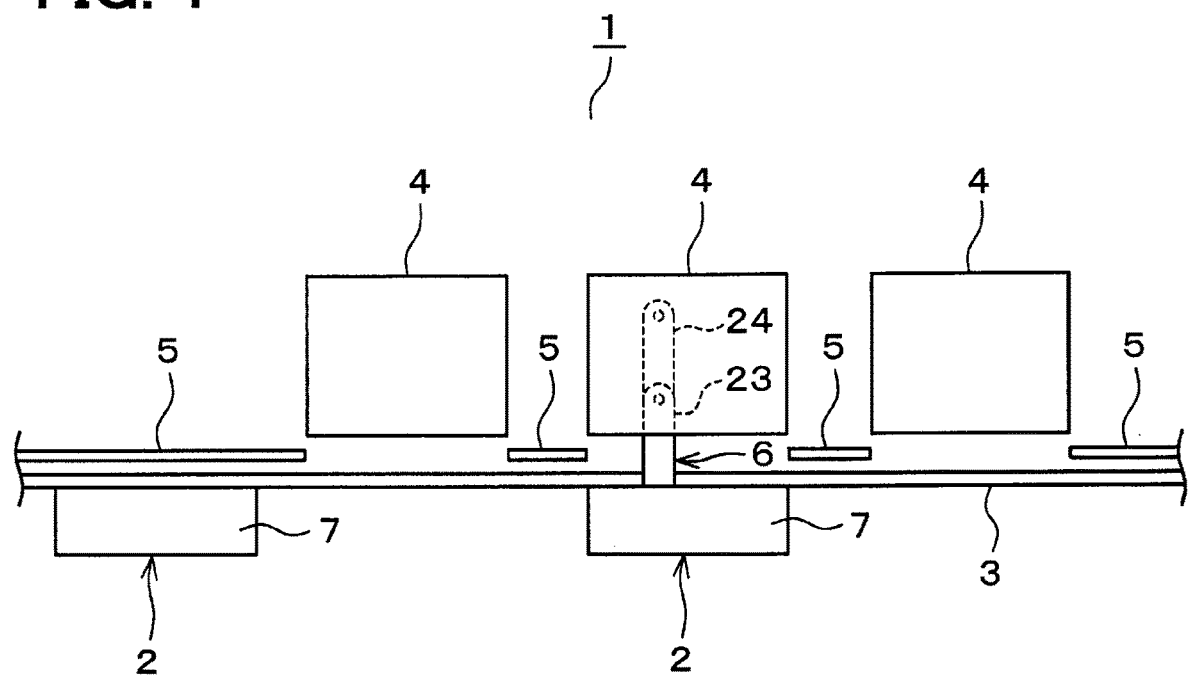
FIG. 1 is a schematic diagram showing a configuration of a production system according to an embodiment.

A production system 1 shown in FIG. 1 is provided in a factory facility. In the production system 1, for example, automobile parts are produced using a mobile robot 2.

In the production system 1, multiple process areas 4 in which the mobile robot 2 performs work are arranged along a linear motion shaft 3 on its one side (e.g. upper side in FIG. 1). In each process area 4, for example, a work area in which the mobile robot 2 performs work is provided, and various equipment required for performing the work are provided.

Figure 2:
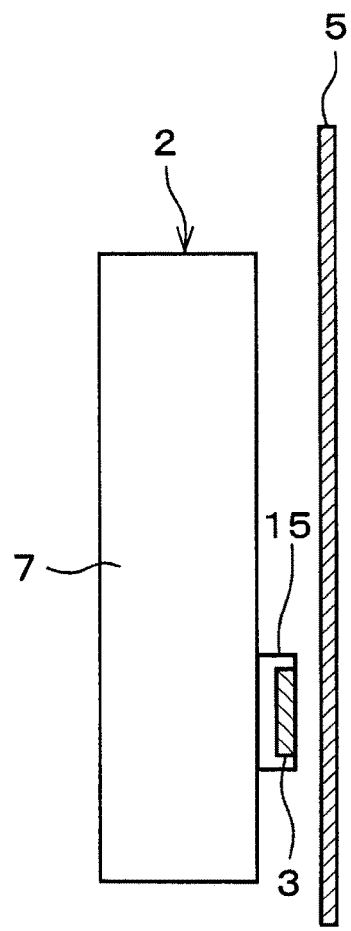
FIG. 2 is a diagram for explaining a positional relationship between a mobile robot and a wall.

On the one side (i.e. the upper side in FIG. 1) of the linear motion shaft 3, walls 5 are erected in places where the process areas 4 are not provided. Each wall 5 is made of a transparent member such as plastic. As also shown in FIG. 2, the wall 5 is arranged at a position close to the linear motion shaft 3 and the mobile robot 2. The position close to the mobile robot 2 is a position where a human hand does not enter a gap between the wall 5 and the mobile robot 2.

The linear motion shaft 3 extends along an arrangement direction of the multiple process areas 4 (i.e. right-left direction in FIG. 1) and is provided, for example, on the floor of the factory. On another side (i.e. lower side in FIG. 1) of the linear motion shaft 3 opposite to the one side on which the process areas 4 are arranged, a passage for a worker is provided, for example.

The mobile robot 2 moves linearly in the right-left direction in FIG. 1 along the linear motion shaft 3, thereby moving between the process areas 4. Further, the mobile robot 2 performs a predetermined work in front of the process area 4. The predetermined work includes, for example, attaching a part to a workpiece, processing a workpiece, and inspecting a workpiece.

Subsequently, a configuration of the mobile robot 2 will be described with reference to FIGS. 3 to 13 which schematically show the configuration.

A robot 6 included in the mobile robot 2 is in a state of being housed in a cover 7 during movement of the mobile robot 2. The cover 7 has a rectangular box shape, in which a plate-shaped lid member (not shown) is attached to a frame 7a which surrounds the cover 7. However, the lid member is not attached to a front face of the cover 7 facing the process area 4, and therefore an opening 7b exists. In front of the process area 4, the robot 6 carries out a work involving an operation of moving an arm end toward the process area 4 through the opening 7b.

Figure 3:
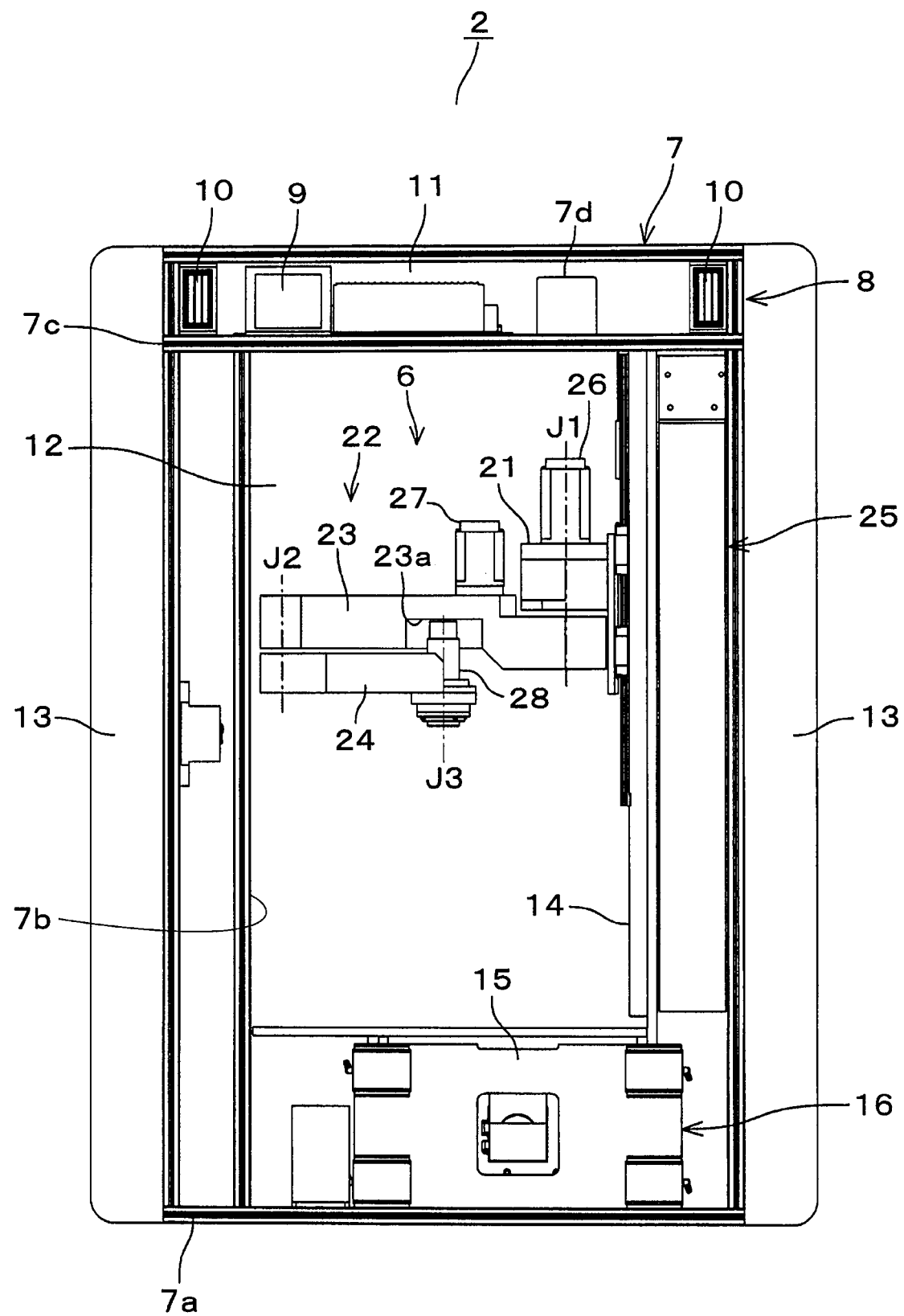
FIG. 3 is a view showing the mobile robot when viewed from a process area with respect to a linear motion shaft and showing a state where a base is positioned at an intermediate portion in a vertical direction.

An electric device unit 8 is disposed in a portion upward of the robot 6 in the cover 7 in a vertical direction (up-down direction in FIG. 3 and other drawings). The electric device unit 8 includes as electric components, for example, a speaker 9 that generates sound when moving, an indicating lamp 10 that lights up when moving, various switches and terminal blocks (not shown). The cover 7 includes a partition plate 7c that separates a first housing space 11 in which the electric device unit 8 is housed and a second housing space 12 in which the robot 6 is housed.

The mobile robot 2 includes bumpers 13 for relieving an impact in case of collision. The bumpers 13 are attached to both side surfaces of the cover 7. A controller that controls an operation of the robot 6, a power supply that supplies power to the robot 6, and the like are provided outside the mobile robot 2 and are connected via a cable or the like.

Figure 4:
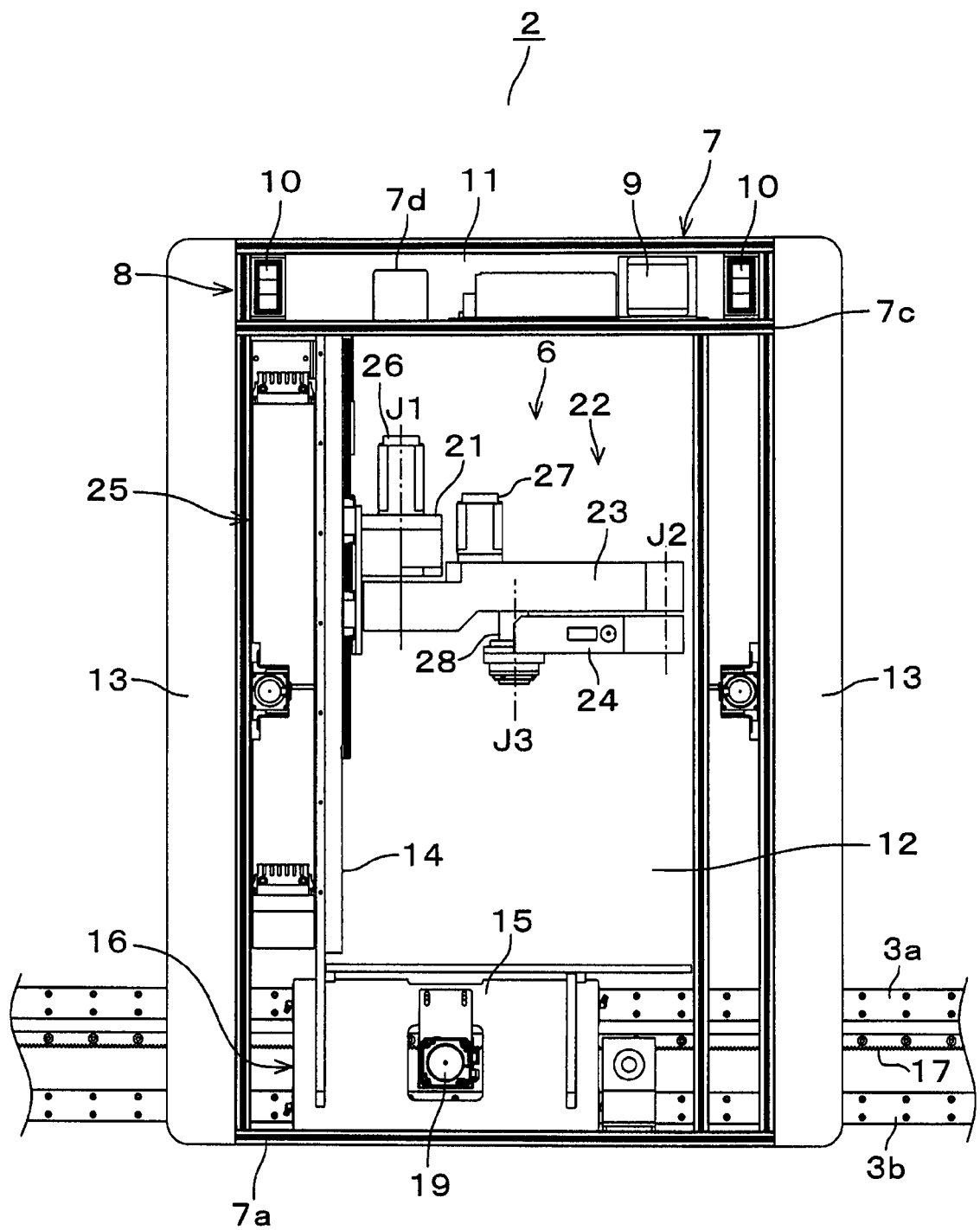
FIG. 4 is a view showing the mobile robot when viewed from an area opposite to the process area with respect to the linear motion shaft and showing the state where the base is positioned at the intermediate portion in the vertical direction.
Figure 7:
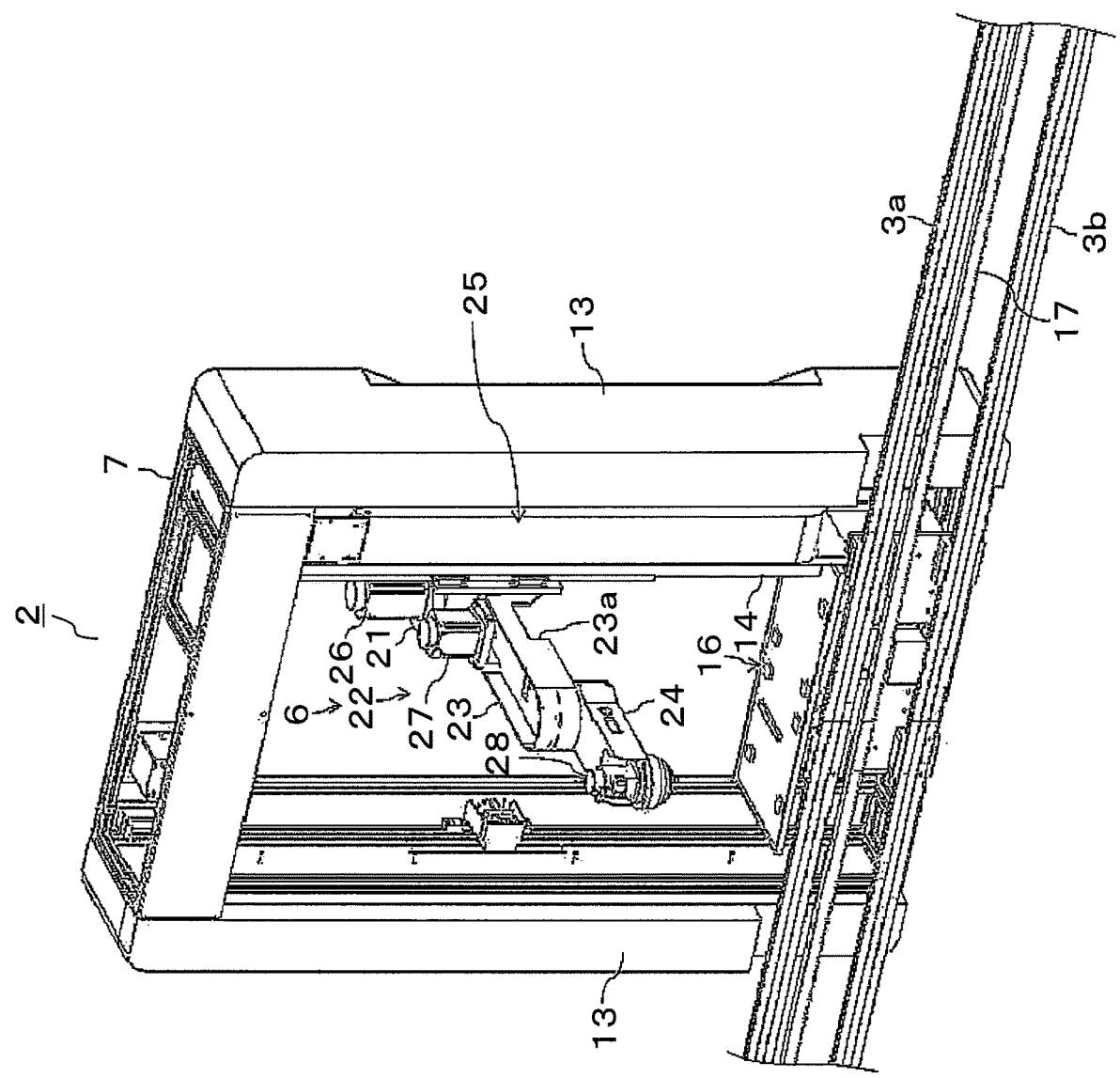
FIG. 7 is a perspective view showing the mobile robot when viewed from the process area with respect to the linear motion shaft and showing a state where an arm is extended.
Figure 8:
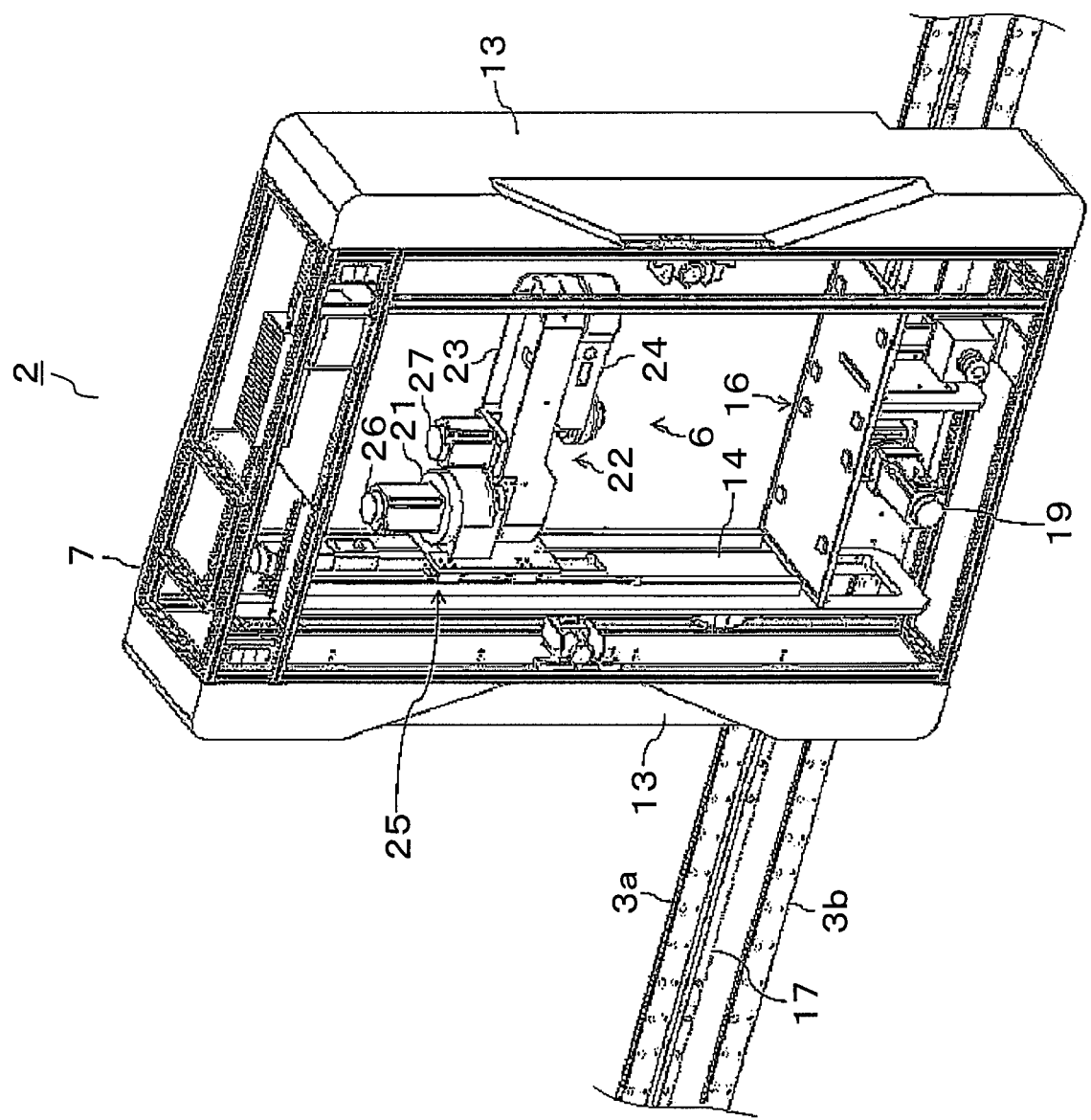
FIG. 8 is a perspective view showing the mobile robot when viewed from the area opposite to the process area with respect to the linear motion shaft and showing a state where the arm is folded.

The mobile robot 2 includes a movable body 14 which linearly moves along the linear motion shaft 3. In this case, the movable body 14 is made of, for example, a plate or the like. The movable body 14 is linearly movably supported by the linear motion shaft 3 via a slider 15 attached to the lower end portion of the movable body 14. The movable body 14 freely moves along linear motion shaft 3 in the right-left direction in FIG. 3, i.e. the horizontal direction. As shown in FIGS. 4, 7 and 8, the linear motion shaft 3 includes two rails 3a and 3b arranged in parallel in the vertical direction.

The mobile robot 2 includes a transport mechanism 16 which is a drive mechanism driving the movable body 14 to move linearly. The transport mechanism 16 is disposed downward of the robot 6 in the vertical direction. The transport mechanism 16 has a rack and pinion drive mechanism including a rack 17 provided to rails 3a and 3b, a pinion 18 provided to the movable body 14, and a motor 19 for rotating the pinion 18.

Figure 9:
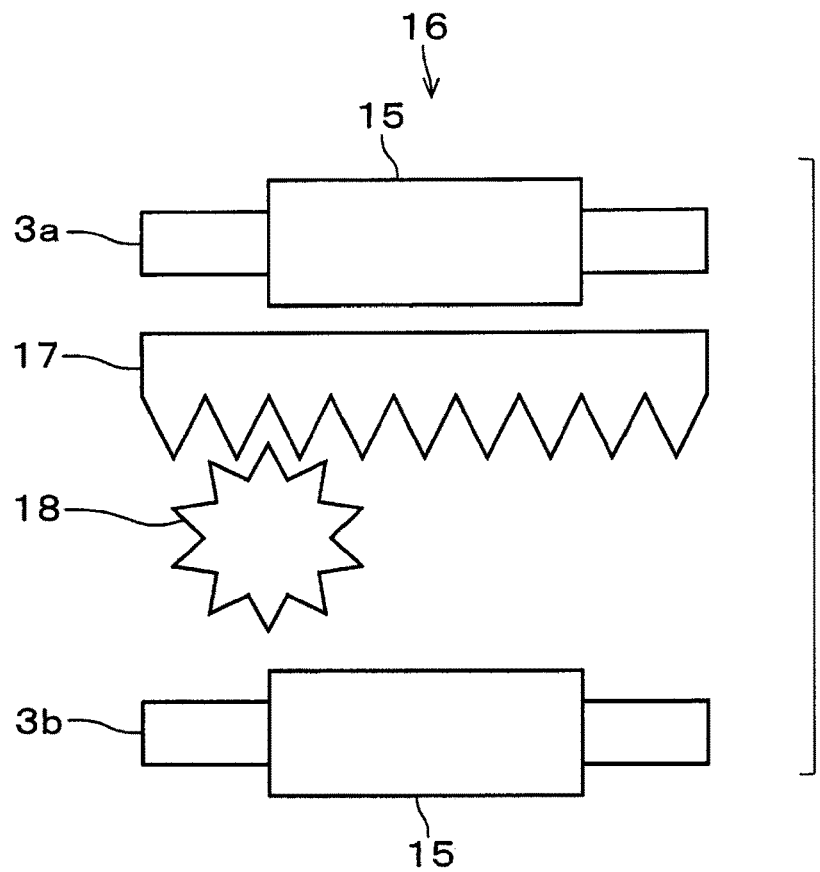
FIG. 9 is a schematic front view showing a configuration of a transport mechanism.
Figure 10:
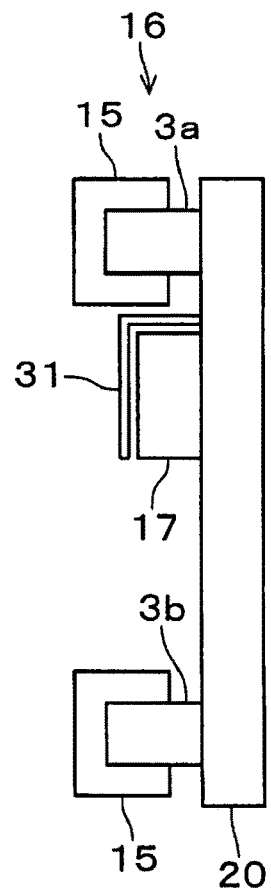
FIG. 10 is a schematic side view showing the configuration of the transport mechanism.

FIGS. 9 and 10 schematically show an arrangement of the transport mechanism 16 and the components related thereto. FIG. 10 shows a rail fixing member 20 for installing the rails 3a and 3b on, for example, the floor of a factory. As shown in FIGS. 9 and 10, the rail 3a is provided upward of the rack 17 and the pinion 18 in the vertical direction, and the rail 3b is provided downward of the rack 17 and the pinion 18 in the vertical direction.

In the above-described configuration, the rack 17 and the pinion 18 are arranged so that their teeth are meshed with each other in the vertical direction. Also, the rack 17 is arranged such that its teeth are oriented downward in the vertical direction. In this case, the transport mechanism 16 is provided with a cover 31 that covers an upper side of the rack 17 in the vertical direction and continuously covers a side surface portion of the rack 17.

The robot 6 includes a base 21 and an arm portion 22. The arm portion 22 has a two arm configuration, and includes a first arm 23 and a second arm 24. The base 21 is attached to the plate constituting the movable body 14 such that the base 21 is movable in the vertical direction. That is, the robot 6 is attached to the movable body 14 via the base 21 such that the robot 6 is movable upward and downward along the vertical direction. The elevating mechanism 25 is a driving mechanism for performing an elevating operation of moving the base 21 in the vertical direction. The elevating mechanism 25 is supported by the plate constituting the movable body 14.

A proximal end part of the first arm 23 is connected to the base 21 such that the proximal end part of the first arm 23 is rotatable around a vertical shaft 31. The first arm 23 is swung (rotated) in the horizontal direction around the vertical shaft 31 by a drive mechanism including a motor 26. The motor 26 is disposed above the base 21 so that an end part of a rotation shaft of the motor 26 faces downward in the vertical direction. The end part of the rotation shaft of the motor protrudes from a main body of the motor.

A distal end part of the first arm 23 which is an end part opposite to the vertical shaft 31 is connected to a proximal end part of the second arm 24 such that the proximal end part of the second arm 24 is rotatable around a vertical shaft 32. The second arm 24 is swung (rotated) in the horizontal direction around the vertical shaft 32 by a drive mechanism including a motor 27, a pulley and a belt (not shown). The motor 27 is disposed above the first arm 23 such that an end of a rotation shaft of the motor 27 faces downward in the vertical direction.

A distal end part of the second arm 24 which is an end part opposite to the vertical shaft 32 serves as the arm end of the robot 6. For example, a working tool (not shown) such as a chuck (hand) for gripping a workpiece can be detachably attached to the arm end. A tool attached to the distal end part of the second arm 24 is rotated around a vertical shaft 33 by a drive mechanism including a motor 28. The motor 28 is disposed above the second arm 24 such that an end of a rotation shaft of the motor 28 faces downward in the vertical direction.

In this case, an arm length of the second arm 24 is shorter than an arm length of the first arm 23. As shown in FIGS. 3 and 8, the robot 6 is configured to be accommodated in the cover 7 in a state where the first arm 23 and the second arm 24 are folded so as to overlap each other in the vertical direction. A lateral surface of the first arm 23 facing the process area 4 has a cutout portion 23a that is capable of housing a part of the motor 28 in the above-described arrangement state.

In the above configuration, the vertical shaft 31 corresponds to a first vertical shaft, and the motor 26 corresponds to a first motor for generating a driving force to drive the first vertical shaft. The vertical shaft 32 corresponds to a second vertical shaft, and the motor 27 corresponds to a second motor for generating a driving force to drive the second vertical shaft. The vertical shaft 33 corresponds to a third vertical shaft, and the motor 28 corresponds to a third motor for generating a driving force to rotate the tool attached to the arm end about the third vertical shaft.

Figure 5:
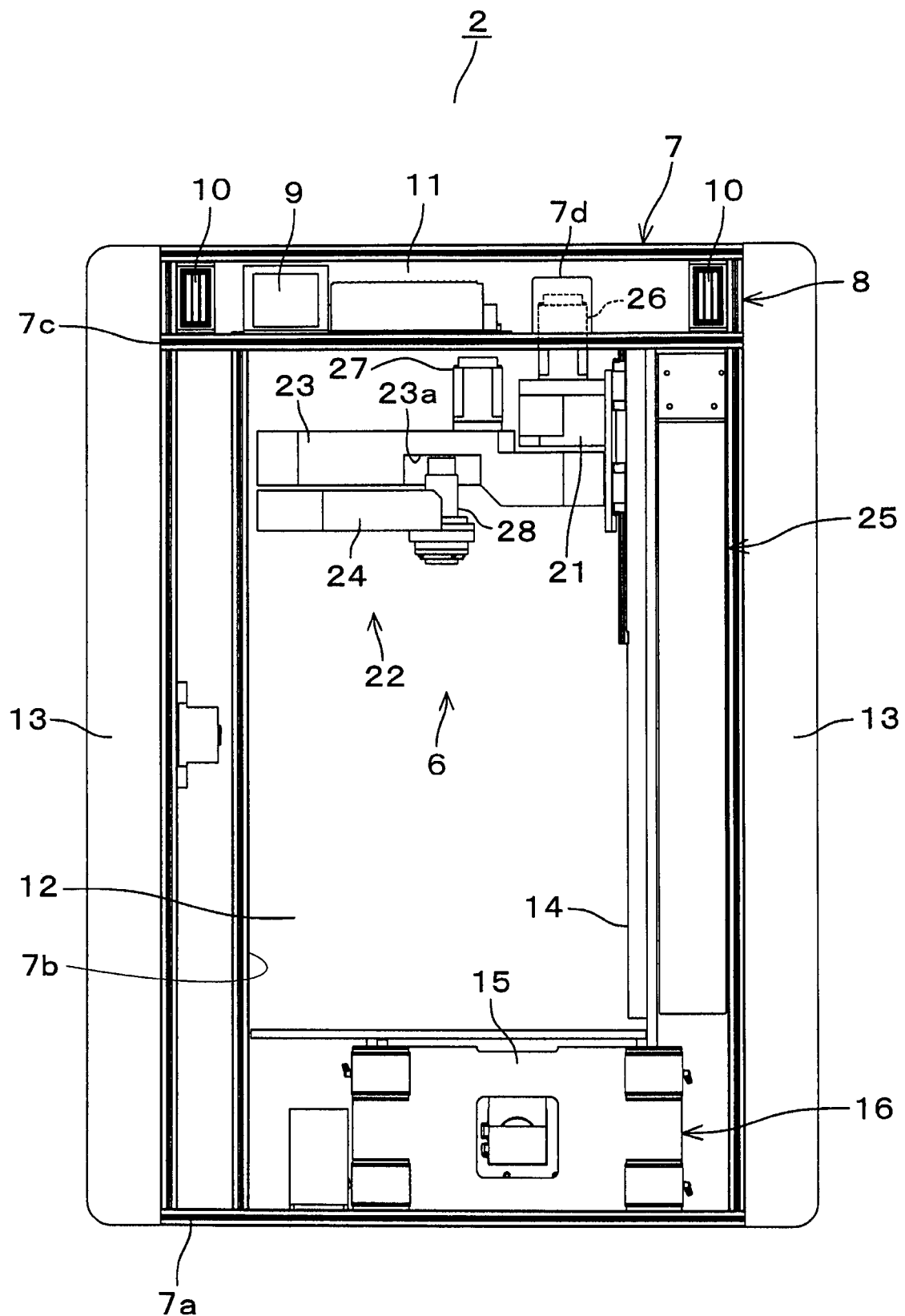
FIG. 5 is a view showing the mobile robot when viewed from the process area across the linear motion shaft and showing a state where the base is positioned at an uppermost portion in the vertical direction.
Figure 6:
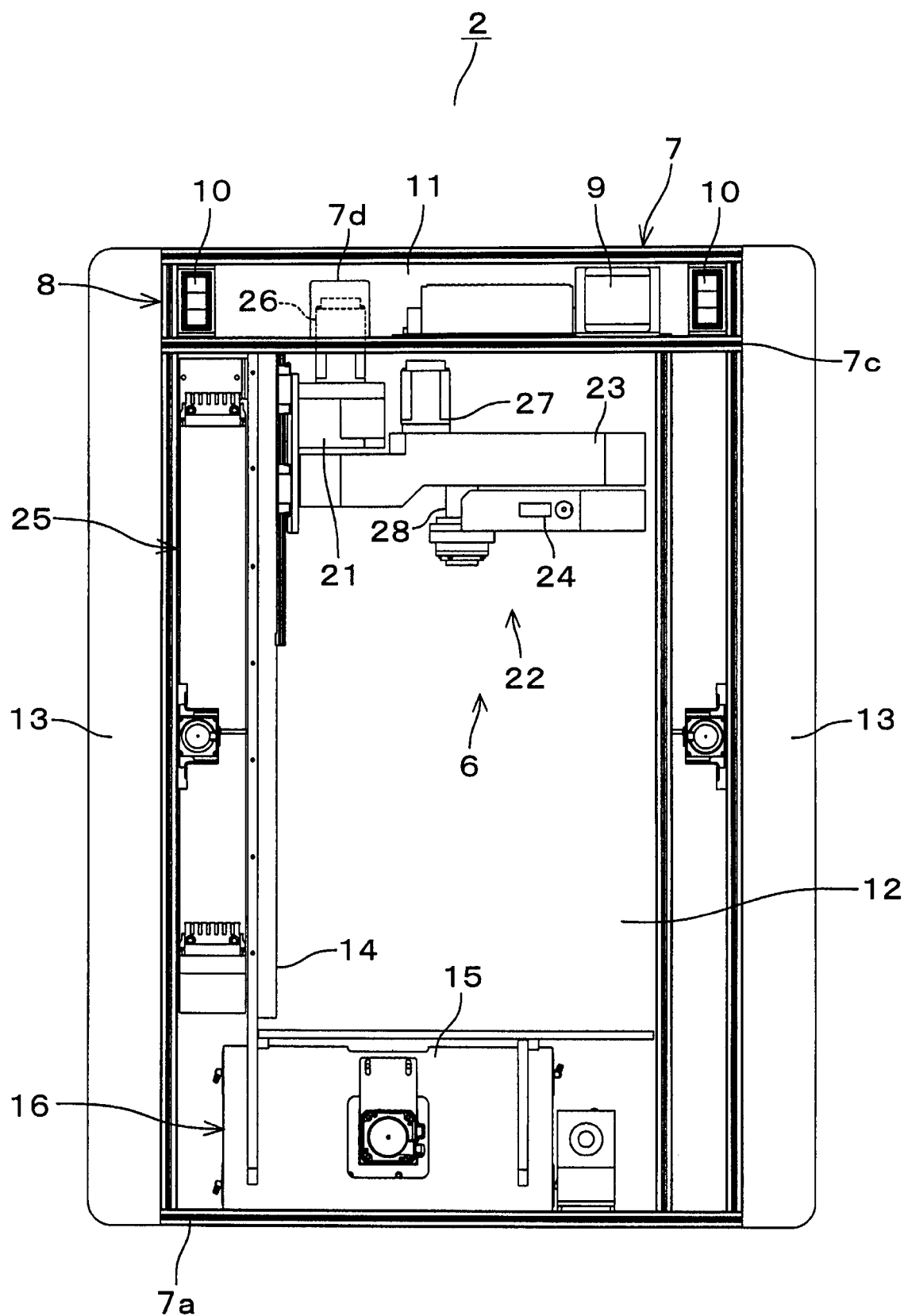
FIG. 6 is a view showing the mobile robot when viewed from the area opposite to the process area with respect to the linear motion shaft and showing the state where the base is positioned at the uppermost portion in the vertical direction.

As shown in FIGS. 3 to 6, the partition plate 7c includes a cup-shaped protrusion 7d protruding in a direction from the second housing space 12 toward the first housing space 11 provided in the cover 7. The protrusion 7d provides the second housing space 12 with a motor housing space where a part of the motor 26 can be housed. As a result, as shown in FIGS. 5 and 6, when the base 21 moves up to the uppermost portion in the vertical direction by the elevating operation, a part of the motor 26 is hosed in the motor housing space.

Figure 11:
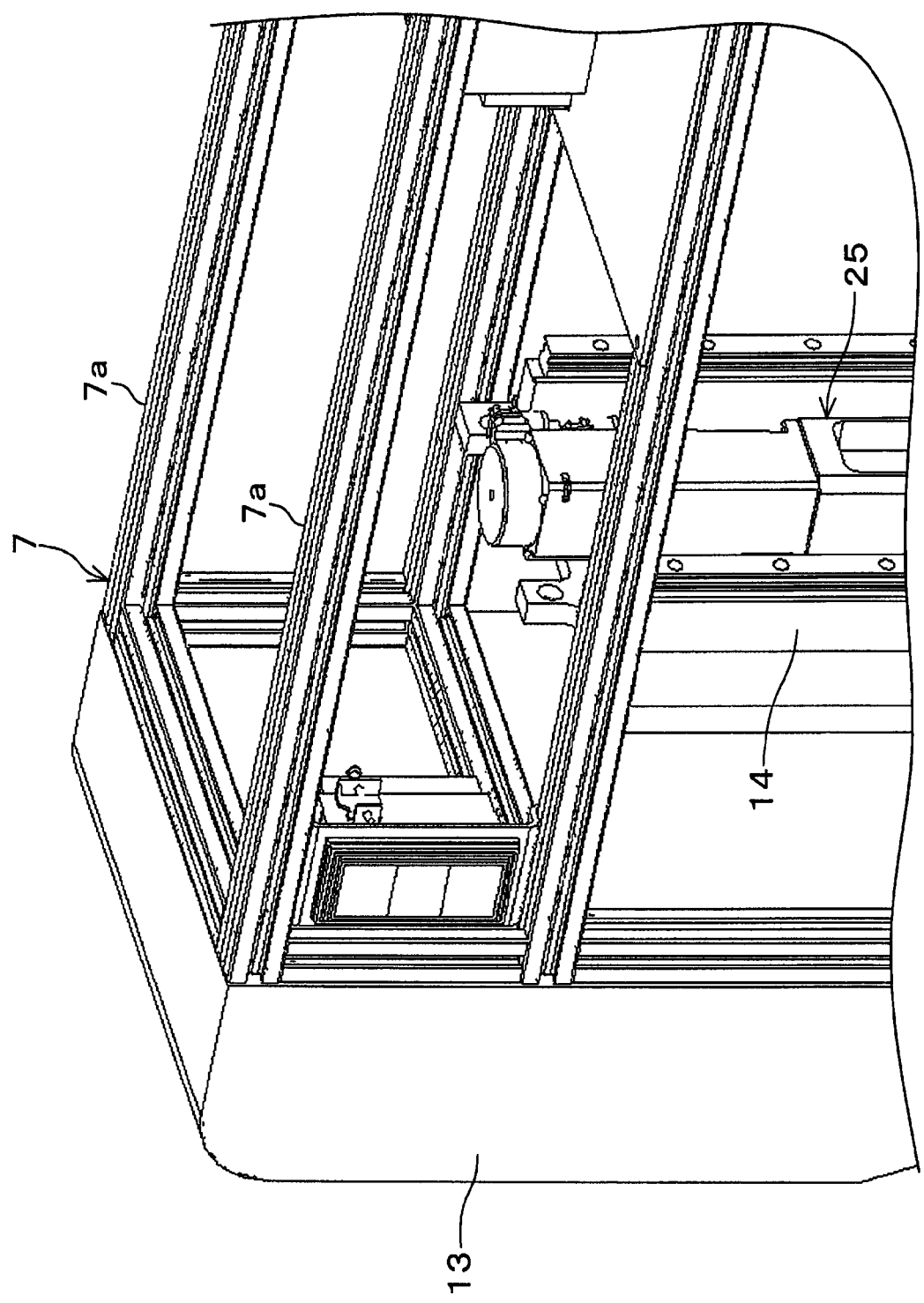
FIG. 11 is a perspective enlarged view showing a plate of a movable body and a frame of a cover in an upper portion of the mobile robot in the vertical direction.

Although not shown in detail, the frame 7a constituting an outer shell of the cover 7 is supported by the transport mechanism 16 in a vertically lower portion of the frame 7a. The plate of the movable body 14 supporting the elevating mechanism 25 and the base 21 is fixed to the vertically lower portion of the frame 7a via the transport mechanism 16. However, as shown in FIG. 11, the plate of the movable body 14 is separated from the frame 7a at the upper side portion in the vertical direction. In other words, the plate of the movable body 14 and the frame 7a of the cover 7 are not fixed to each other, and are free from each other.

Figure 12:
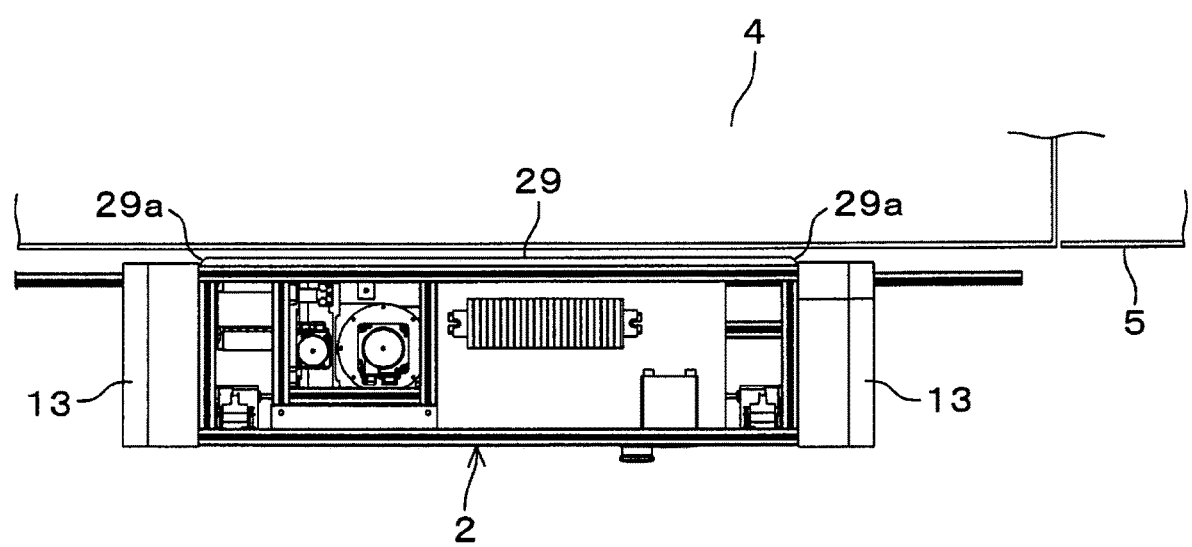
FIG. 12 is a top view showing the mobile robot in the vertical direction.
Figure 13:
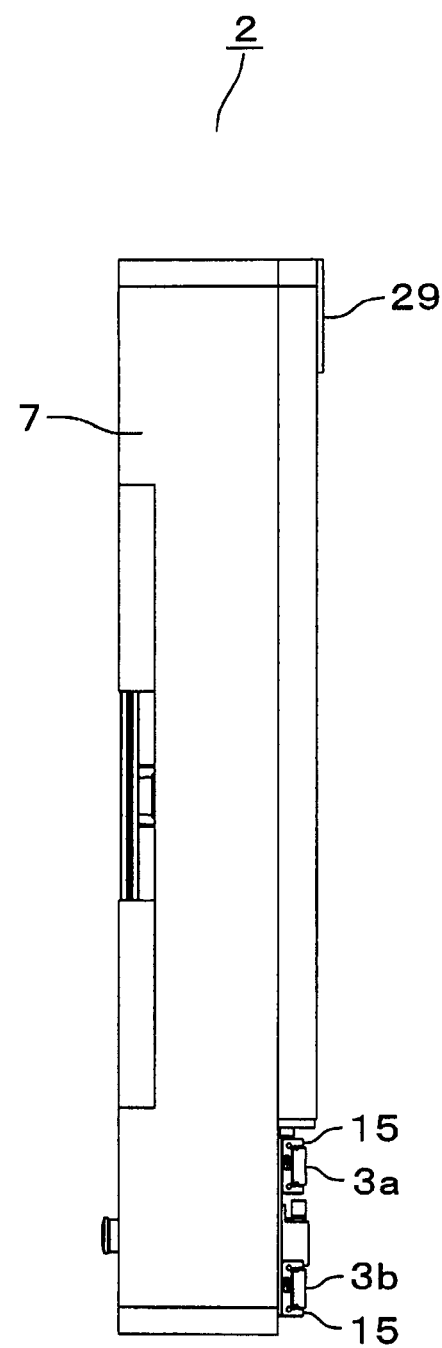
FIG. 13 is a side view showing the mobile robot in a horizontal direction.

As shown in FIGS. 12 and 13, the mobile robot 2 includes a plate member 29 that covers a part of an upper area in the vertical direction on a side of the cover 7 facing the process area 4. As shown in FIG. 13, the plate member 29 has a size to cover only an upper side in the vertical direction than the opening 7b of the cover 7 so as not to hinder the operation of the arm portion 22 of the robot 6.

As shown in FIG. 12, both side surfaces of the plate member 29 in the horizontal direction (i.e. direction of linear movement of the movable body 14) are tapered, that is, the left and right side surfaces in FIG. 12 are tapered. Specifically, tapered portions 29a are formed on both end surfaces of the plate member 29 so that the thickness of the plate member 29 becomes smaller sideward.

Next, an operation of the above configuration will be described.

The robot 6 is housed in the cover 7 during movement of the mobile robot 2 between the process areas 4. At this time, the robot 6 is in an arrangement state as shown in FIG. 8, that is, an arrangement state in which the first arm 23 and the second arm 24 are folded so as to overlap each other in the vertical direction.

In front of the process area 4, the robot 6 carries out a work involving an operation of moving the distal end part of the second arm 24 which is the arm end toward the process area 4. Specifically, the robot 6 rotates the first arm 23 in a first rotation direction (for example, counterclockwise), and at the same time, rotates the second arm 24 in a second rotation direction opposite to the first rotation direction (for example, clockwise). As a result, the distal end part of the second arm 24 moves toward the process area 4. In the present embodiment, angular velocities of rotation of the first arm 23 and the second arm 24 are controlled so that the trajectory traced by the distal end part of the second arm 24 is linear.

As described above, according to the present embodiment, the following effects can be obtained.

In the production system 1, since the robot 6 is accommodated in the cover 7 during the mobile robot 2 moving between the process areas 4, the robot 6 does not contact surrounding people. In front of the process area 4, the robot 6 can perform a predetermined work through the opening 7b of the cover 7. At this time, the periphery of the cover 7 excluding the front face facing the process area 4 is covered with the lid member. Thus, the person can be certainly prevented from contacting the robot 6 from a direction other than from the process area 4 (for example, direction from the passage for a worker to pass).

However, since the opening 7b is present in the cover 7, if a person intentionally takes an action of inserting his hand from the process area 4 into the cover 7 through the opening 7b, there is a possibility of contacting the robot 6. However, it is extremely rare for workers and others to take such action that put themselves in danger, and usually it is almost impossible to take such action, so in most cases there is no problem. However, it is possible to further improve safety by taking countermeasures against such cases where possibility of causing problem is extremely low.

Therefore, in the production system 1, the following countermeasures are taken to prevent contact of a person from the process area 4. That is, in the embodiment, the walls 5 are installed in places where the process areas 4 are not disposed on a side of the linear motion shaft 3 facing the process areas 4. In this way, during the movement of the mobile robot 2, even if a worker or others on the side of the linear motion shaft 3 that faces the process areas 4 moves his or her hand across the linear motion shaft 3 intentionally or without noticing the presence of the mobile robot 2, it will not be able to reach out by being blocked by the walls 5, and will not accidentally contact the robot 6.

In the production system 1, the wall 5 is not provided on the other side (passage side) of the linear motion shaft 3 opposite to the process area 4. This is because there is no process area 4 on the passage side, the visibility is improved and the mobile robot 2 is easy to see. Hence, the possibility of a worker or the like accidentally touching the robot 6 is low. On the contrary, if the wall 5 is provided on the passage side, there is a possibility that visibility deteriorates and the possibility of touching the mobile robot 2 increases. Therefore, in the present embodiment, the wall 5 is not provided on the passage side.

On the other hand, on the side facing the process area 4, there may be a blind spot behind the process area 4 particularly between successive process areas 4, and a worker or others may not notice the presence of the mobile robot 2 (the outlook is not good). If the worker or others suddenly runs out into a path of the mobile robot 2 without noticing the presence of the mobile robot 2, there is a possibility of collision with the mobile robot 2, and there is also a possibility of contact with the robot 6 through the opening 7b. In order to prevent the occurrence of such a situation in advance, in the present embodiment, as described above, the walls 5 are provided in places where the process areas 4 are not provided on the side of the linear motion shaft 3 facing process areas 4, and the wall 5 functions as a safety fence for suppressing the running-out.

Further, in this case, the wall 5 is disposed at a position close to the linear motion shaft 3, and the gap formed between the wall 5 and the mobile robot 2 has only a width that the hand of a person does not enter. Therefore, it is possible to prevent a worker or others from accidentally putting a hand into between the wall 5 and the mobile robot 2 (more specifically, between the wall 5 and the cover 7).

When the wall 5 is installed as described above, the visibility of workers and others may be obstructed and becomes deteriorated as compared with the case where the wall 5 is not installed. Therefore, in the present embodiment, the wall 5 is made of a transparent member such as plastic. In this way, it is possible to improve safety while maintaining the field of view of the workers or others.

Meanwhile, it is conceivable to provide a safety enhancement by providing a shutter that can open and close the opening 7b of the cover 7 without providing the wall 5. In this case, by closing the shutter during the movement, it is possible to prevent the workers or others from touching the robot 6. However, in this case, since the wall 5 does not exist, it is impossible for the workers or others to prevent their hands or legs from moving from between the process areas 4 into the path of the mobile robot 2. Therefore, the hand pushed out from between the process areas 4 may collide with the mobile robot 2. On the other hand, when a wall 5 is provided as in the present embodiment, it is possible to reliably prevent such collision.

As described above, according to the mobile robot 2 of the present embodiment, it is possible to ensure safety of workers and others without securing a large restricted area around the traveling path of the mobile robot 2. Therefore, according to the production system 1 using such the mobile robot 2, it is possible to obtain an excellent effect that the safety to people can be enhanced while reducing the size of the mobile robot 2.

In the above-described configuration, the transport mechanism 16 is disposed downward of the robot 6 in the vertical direction. In this way, the installability of the linear motion shaft 3 is improved as compared with a configuration in which the transport mechanism 16 is disposed upward of the robot 6 in the vertical direction. This is because the linear motion shaft 3 is installed so as to extend along the arrangement direction of the multiple process areas 4. Thus, the length of the linear motion shaft 3 is relatively long, and the weight of the linear motion shaft 3 is relatively heavy. In the configuration in which the transport mechanism 16 is disposed upward of the robot 6, it is necessary to lift such a long and heavy linear motion shaft to the height higher than the robot 6, which may make installation work difficult. On the contrary, according to the configuration in which the transport mechanism 16 is disposed downward of the robot 6 as in the present embodiment, there is no need to lift the long and heavy linear motion shaft 3 to the height higher than the robot 6. Thus, the installation work is facilitated, that is, the installability of the linear motion shaft 3 is improved.

Further, with the above configuration, the total weight of the components other than the linear motion shaft 3, that is, the total weight of the movable body 14, the robot 6 and the cover 7 are also relatively heavy. In the above-described configuration in which the transport mechanism 16 (linear motion shaft 3) is disposed upward of the robot 6, it is necessary to elevate the components other than the linear motion shaft 3, which may make installation work difficult. Further, in the case of the configuration in which the transport mechanism 16 is disposed upward of the robot 6, it is desirable that the linear motion shaft 3 be disposed at a much higher position in order to improve maintainability of equipment. Therefore, with the above configuration, installation work may become more difficult. On the other hand, in the case of the configuration in which the transport mechanism 16 (linear motion shaft 3) is disposed downward of the robot 6, it is desirable that the linear motion shaft 3 be disposed at a much lower position in order to improve maintainability of equipment. Therefore, according to the configuration of the present embodiment, the installation work is further facilitated.

In the above configuration, each of the motors 26 to 28 is disposed such that ends of rotation shafts of the motors 26 to 28 face downward in the vertical direction. In the environment where the robot 6 works, there is a possibility that cutting oil or the like may splash. However, if the motors 26 to 28 are arranged as described above, risk of the cutting oil penetrating the motors 26 to 28 along the rotation shafts can be avoided. The electric device unit 8 is disposed upward of the robot 6 in the cover 7 in the vertical direction. The cover 7 includes the partition plate 7c that separates the first housing space 11 in which the electric device unit 8 is housed and the second housing space 12 in which the robot 6 is housed. Accordingly, it is possible to prevent cutting oil or the like from entering the electric device unit 8 and adversely affecting operation of electric parts.

In the above configuration, in order to keep the length of the mobile robot 2 in the vertical direction, i.e. the height dimension small, the following contrivances have been added. That is, the partition plate 7c has the protrusion 7d protruding in the direction from the second housing space 12 toward the first housing space 11. The protrusion 7d provides the second housing space 12 with a motor housing space where a part of the motor 26 can be housed. When the base 21 moves up to the uppermost portion in the vertical direction by the elevating operation, the part of the motor 26 is hosed in the motor housing space. The robot 6 is configured to be accommodated in the cover 7 in an arrangement state where the first arm 23 and the second arm 24 are folded so as to overlap each other in the vertical direction. The lateral surface of the first arm 23 has the cutout portion 23a that is capable of housing a part of the motor 28 in the above-described arrangement state.

According to the configuration of this embodiment including such contrivance, as compared with a configuration having no such contrivance (hereinafter referred to as a first comparative example), the height dimension of the mobile robot 2 can be kept small without increasing its depth dimension. Hereinafter, effects of the present embodiment described above will be described with reference to FIG. 14 which schematically shows arrangements of respective parts in the present embodiment and the first comparative example.

Figure 14:
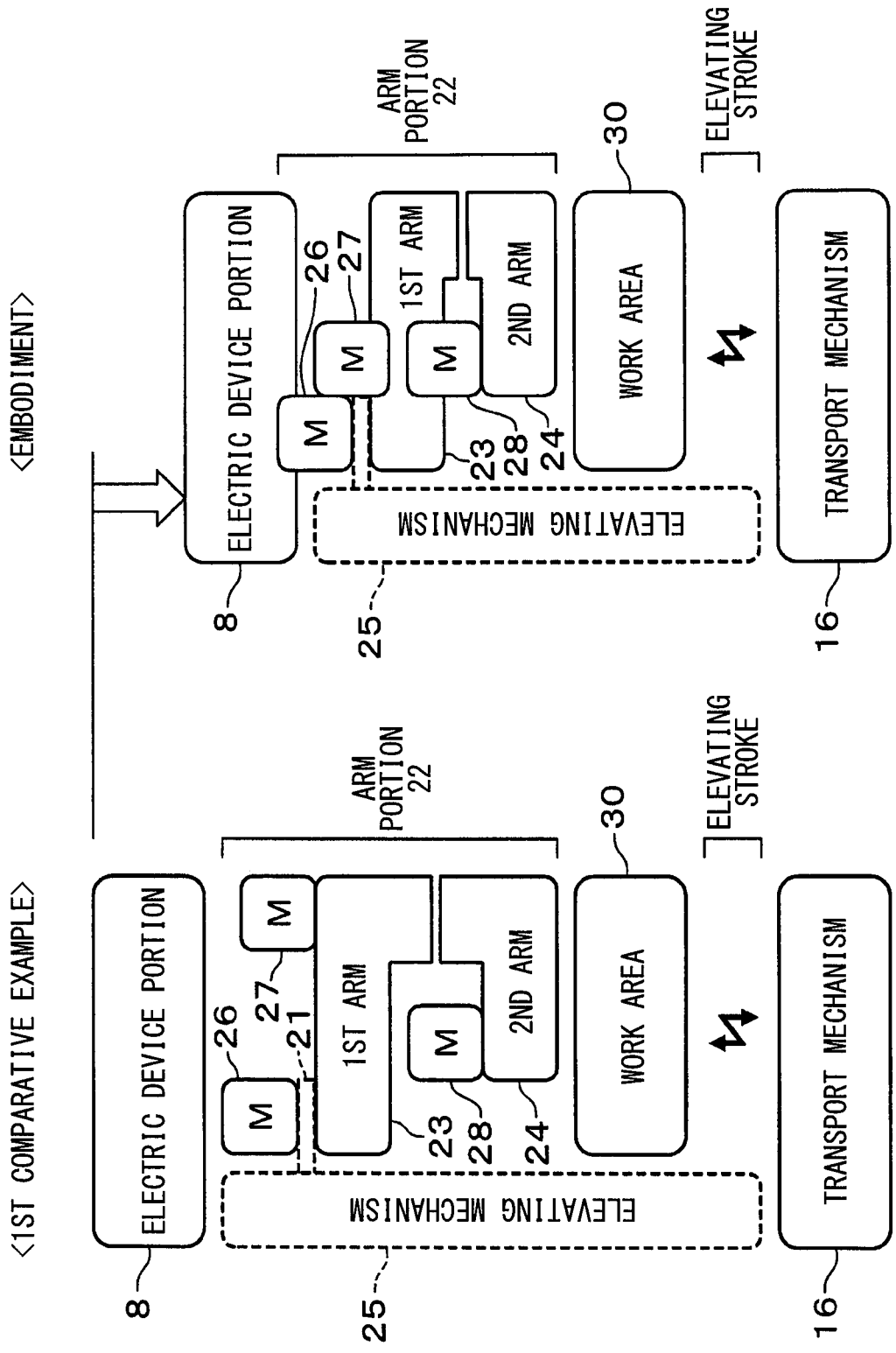
FIG. 14 is a schematic diagram showing arrangements of respective parts according to an embodiment and a first comparative example.

The work area 30 shown in FIG. 14 is an area provided for the robot 6 to perform work. The height dimension of the work area 30 is predetermined in accordance with a height dimension of a tool or workpiece used by the user. In addition, the elevating stroke shown in FIG. 14 is an amount of upward or downward movement of the base 21, and is predetermined in accordance with contents of work performed by the robot 6.

As apparent from FIG. 14, according to the present embodiment, the height dimension of the mobile robot 2 can be kept small while including the amount of upward or downward movement, i.e. elevating stroke, equivalent to that of the first comparative example and including the work area 30 equivalent to that of the first comparative example. The mobile robot 2 of the present embodiment is capable of reducing size in the height direction while realizing drip-proofness.

Therefore, if the production system 1 is configured using such mobile robot 2, the size thereof can be reduced. In addition, the mobile robot 2 having the above configuration is suitable in an environment requiring drip-proof specifications, for example, an environment where there is a possibility of cutting oil adhering to the mobile robot 2.

Furthermore, in the present embodiment, the height of the mobile robot 2 is kept small. As a result, for example, the center of gravity of the mobile robot 2 is lower than that of the configuration of the first comparative example. The low center of gravity of the mobile robot 2 provides an effect of reducing a degree of shaking of the mobile robot 2 to a small degree, for example, during movement of the mobile robot 2.

According to the configuration of the present embodiment, as described above, the height dimension of the mobile robot 2 can be kept small, but instead of keeping the height dimension small, it is possible to further increase the work area 30 and the elevating stroke. This makes it possible to cope with a relatively large workpiece, for example. Therefore, it is possible to obtain an effect that the range of work performed by the mobile robot 2 is expanded.

In the configuration according to the present embodiment, electric parts are provided in the first housing space 11. The degree of freedom of arrangement of these electric parts is extremely high as compared with mechanical parts having restrictions on arrangement. Therefore, according to the present embodiment, it is possible to easily secure the above-described motor housing space in the first housing space 11.

In the above-described configuration, the transport mechanism 16 is disposed downward of the robot 6 in the vertical direction. The frame 7a constituting the outer shell of the cover 7 is supported by the transport mechanism 16 in the vertically lower portion of the frame 7a. The plate of the movable body 14 supporting the elevating mechanism 25 and the base 21 of the robot 6 is fixed to the vertically lower portion of the frame 7a and is spaced from a vertically upper portion of the frame 7a. According to such configuration, when the robot 6 operates, vibrations caused by the operation are easily attenuated.

Figure 15:
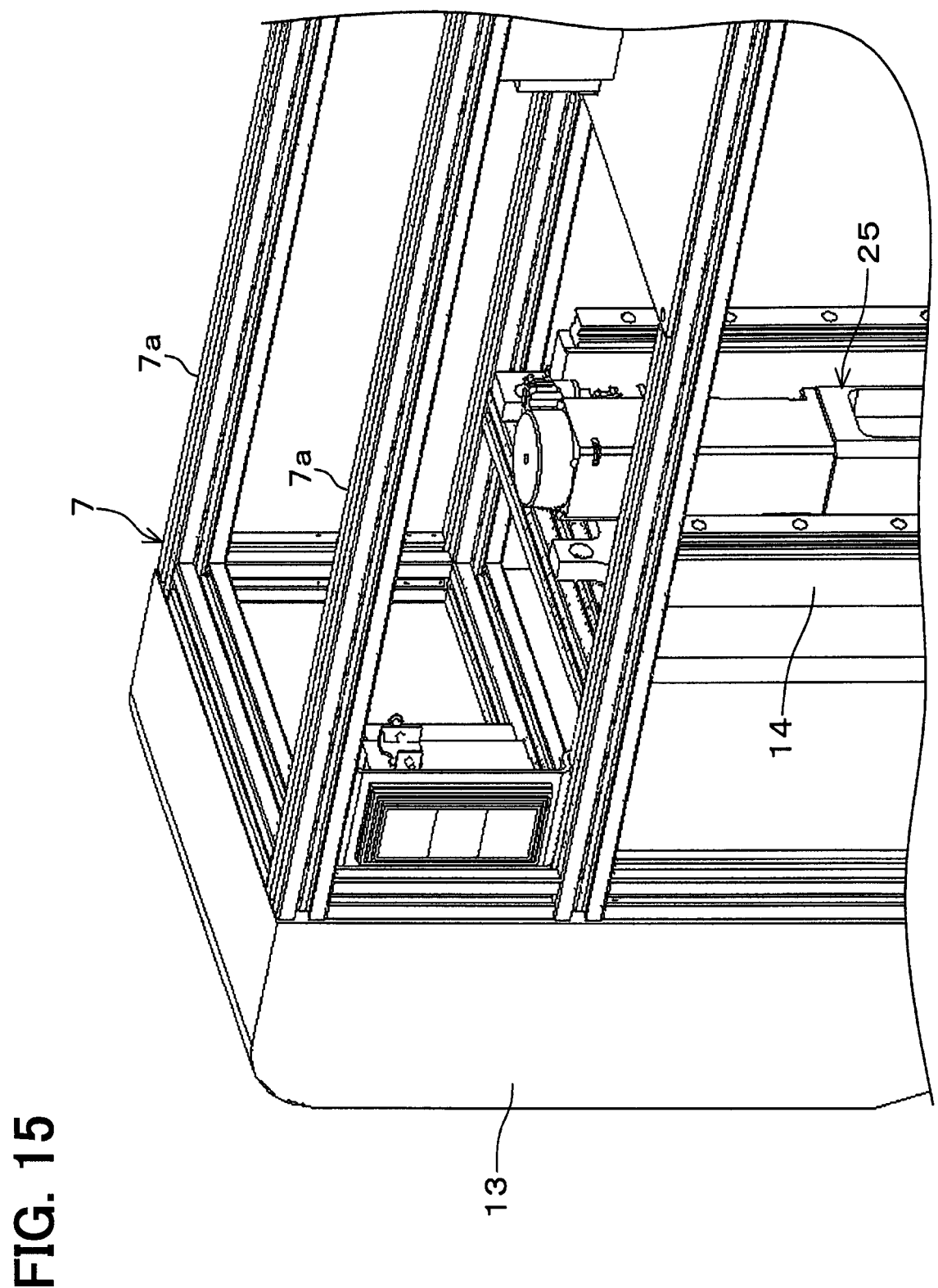
FIG. 15 is a perspective enlarged view showing a plate of a movable body and a frame of a cover in an upper portion of a mobile robot in a vertical direction, according to a second comparative example.

Hereinafter, effects of the present embodiment will be described by comparing the present embodiment with a second comparative example. In the second comparative example, as shown in FIG. 15, the plate of the movable body 14 supporting the elevating mechanism 25 and the base 21 of the robot 6 is fixed also to the vertically upper part of the frame 7a by, for example, a screw. Vibrations caused by the movement of the robot 6 are transmitted to the lower portion of the frame 7a via the elevating mechanism 25, whereby the frame 7a and eventually the cover 7 vibrate. As in the second comparative example, assuming that the elevating mechanism 25 is also connected to the vertically upper portion of the frame 7a, the vibration of the frame 7a may be again transmitted to the robot 6 via the elevating mechanism 25. As a result, the vibration of the robot 6 may become difficult to be attenuated, or conversely, may be amplified.

On the other hand, in the configuration of the present embodiment, since the elevating mechanism 25 is spaced from the vertically upper portion the frame 7a, the vibration of the frame 7a cannot be transmitted to the robot 6 again. In addition, since the vertically upper portion of the elevating mechanism 25 is in a free state, the elevating mechanism 25 can freely oscillate with vibration generated by the operation of the robot 6, and the vibration cannot be amplified. Therefore, in the above configuration, the vibration caused by the operation of the robot 6 can be easily attenuated without being amplified. Hence, according to the mobile robot having the above configuration, vibration can be suppressed.

Figure 16:
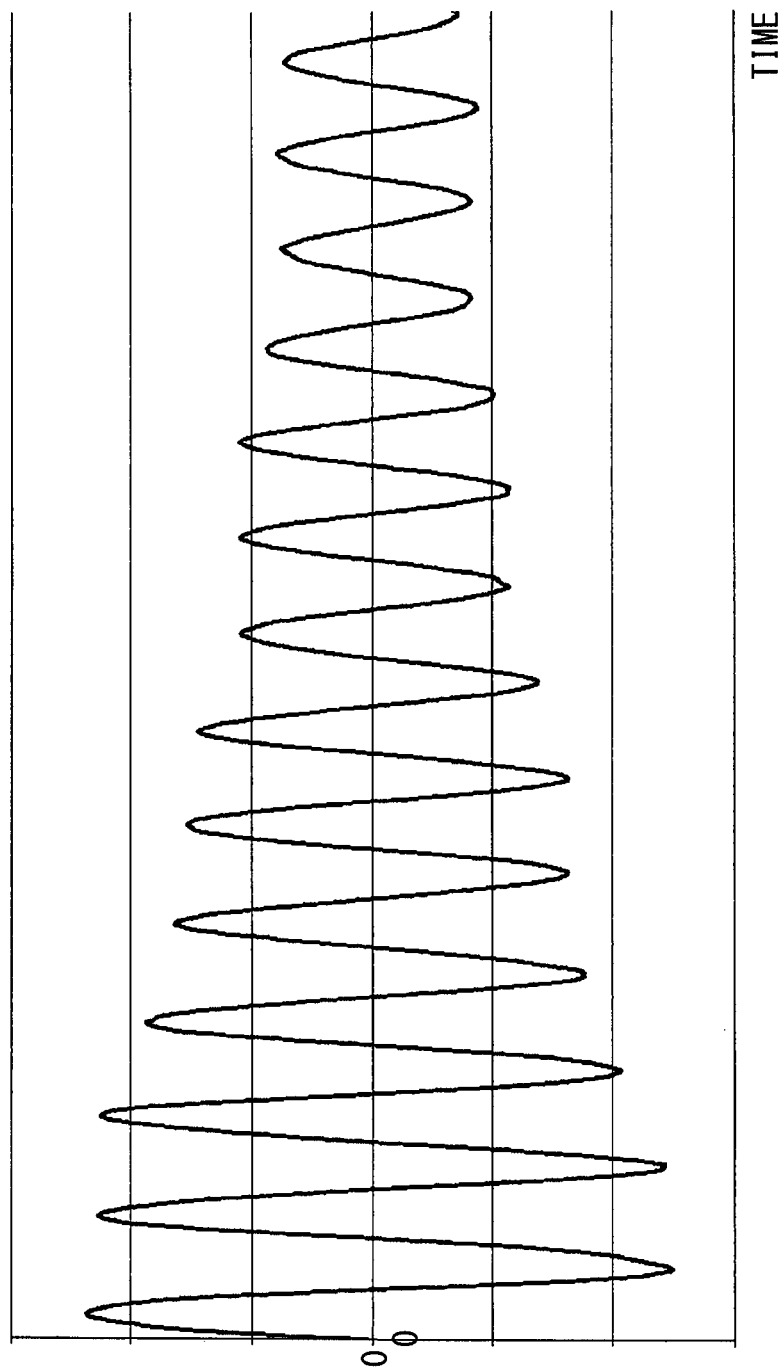
FIG. 16 is a diagram showing a displacement of an arm end in the horizontal direction during an arm portion being operated from a folded state into a state extended toward the process area in a configuration of the second comparative example.
Figure 17:
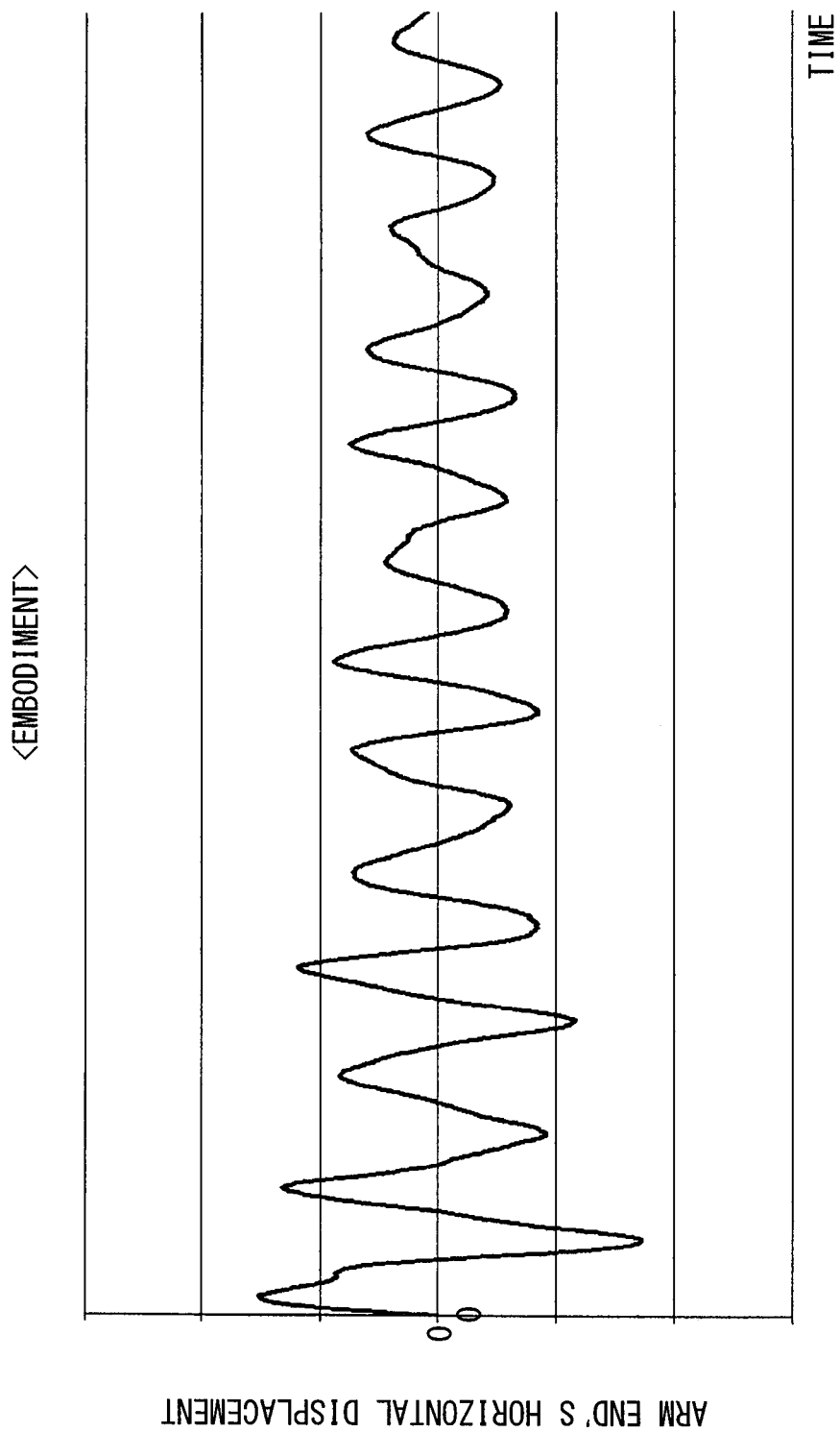
FIG. 17 is a diagram showing a displacement of an arm end in the horizontal direction during an arm portion being operated from a folded state into a state extended toward the process area in a configuration of the embodiment.

FIGS. 16 and 17 show displacements of the distal end part of the second arm 24 in the horizontal direction during the arm portion 22 being operated from a folded state into a state extended toward the process area 4 according to each of the configurations of the second comparative example and the present embodiment. As is apparent from FIGS. 16 and 17, according to the configuration of the present embodiment, the influence of the vibration generated by the operation of the robot 6 on the arm end is smaller than that of the configuration of the second comparative example. Therefore, if the production system 1 is configured using such mobile robot 2, for example, it is possible to reduce the occurrence of a work error caused by the shaking of the robot 6 during a loading operation or a discharge operation of a workpiece. As a result, it is possible to shorten the operation time.

In addition, according to the configuration of the present embodiment, the elevating mechanism 25 is fixed to the vertically lower portion of the frame 7a via the transport mechanism 16. That is, in this case, both the frame 7a and the elevating mechanism 25 are supported by the transport mechanism 16 in the vertically lower portion. In this case, the vertically lower portion of the frame 7a and the elevating mechanism 25 are spaced from each other. If the frame 7a and the elevating mechanism 25 are mutually connected at the vertically upper portion as in the second comparative example, the frame 7a and the elevating mechanism 25 can be regarded as an integral component. Therefore, in this case, when vibration occurs due to the motion of the robot 6, the frame 7a and the elevating mechanism 25 vibrate with the natural frequency of their constituent.

On the other hand, in the configuration according to the present embodiment, the vertically upper portion of the frame 7a and the elevating mechanism 25 are spaced from each other. Therefore, when vibration is generated by the operation of the robot 6, the frame 7a vibrates with the natural frequency of the frame 7a, and the elevating mechanism 25 vibrates with the natural frequency of the elevating mechanism 25. Therefore, in the above configuration, when vibration is generated by the operation of the robot 6, the vibration of the frame 7a and the vibration of the elevating mechanism 25 can cancel each other via the transport mechanism 16. As a result, the vibration caused by the operation of the robot 6 is more easily attenuated.

In the above configuration, the elevating mechanism 25 is completely separated from the vertically upper portion of the frame 7a. Therefore, for example, there is a possibility that the elevating mechanism 25 and the robot 6 vibrate when the robot 6 is not operating, such as when moving between the process areas 4. Therefore, a buffer member made of, for example, a damper may be interposed between a vertically upper portion of the elevating mechanism 25 and the frame 7a.

By providing the buffer member in this manner, it is possible to reduce vibration when the robot 6 is not operating. Even when the buffer member is provided in this manner, the transmission of vibrations between the vertically upper portion of the elevating mechanism 25 and the frame 7a is hindered by the buffer member. Therefore, it is possible to suppress the vibration from being amplified when the robot 6 is operated, while suppressing the vibration at the time of non-operation of the robot 6, and to quickly attenuate the shake caused by the operation of the robot 6. Therefore, in the above configuration, when vibration is generated by the operation of the robot 6, the vibration of the frame 7a and the vibration of the elevating mechanism 25 can cancel each other via the buffer member. As a result, the vibration caused by the operation of the robot 6 is more easily attenuated.

The mobile robot 2 according to the present embodiment includes the plate member 29 that covers a part of the upper area in the vertical direction on the side of the cover 7 facing the process area 4. In addition, the tapered portions 29a are formed on both end surfaces of the plate member 29 so that the thickness of the plate member 29 becomes smaller sideward. According to such a configuration, even if the mobile robot 2 shakes while moving between the process areas 4, the plate member 29 which is nearest to the process areas 4 among the components of the mobile robot 2 contacts the equipment and the walls 5 provided in the process areas 4. The contact of the plate member 29 restrains increase in shaking of the mobile robot 2 caused by being pushed back away from the process area 4.

Further, when the plate member 29 comes into contact with the equipment or the wall 5 provided in the process area 4, the tapered portions 29a formed on both end surfaces of the plate member 29 can make the plate member 29 move beyond a step provided by a gap between the equipment and the walls 5 without getting caught on the step. As described above, according to the present embodiment, even if a shake occurs while the mobile robot 2 is moving between the process areas 4, the mobile robot 2 can be smoothly moved without being greatly affected by the shaking.

In the above configuration, the linear motion shaft 3 includes the two rails 3a and 3b arranged in parallel in the vertical direction. The movable body 14 is supported by the rails 3a and 3b via the slider 15 provided on the lower side of the movable body 14 in the vertical direction. The transport mechanism 16 has a rack and pinion drive mechanism including the rack 17 provided to rails 3a and 3b, and the pinion 18 provided to the movable body 14.

Figure 18:
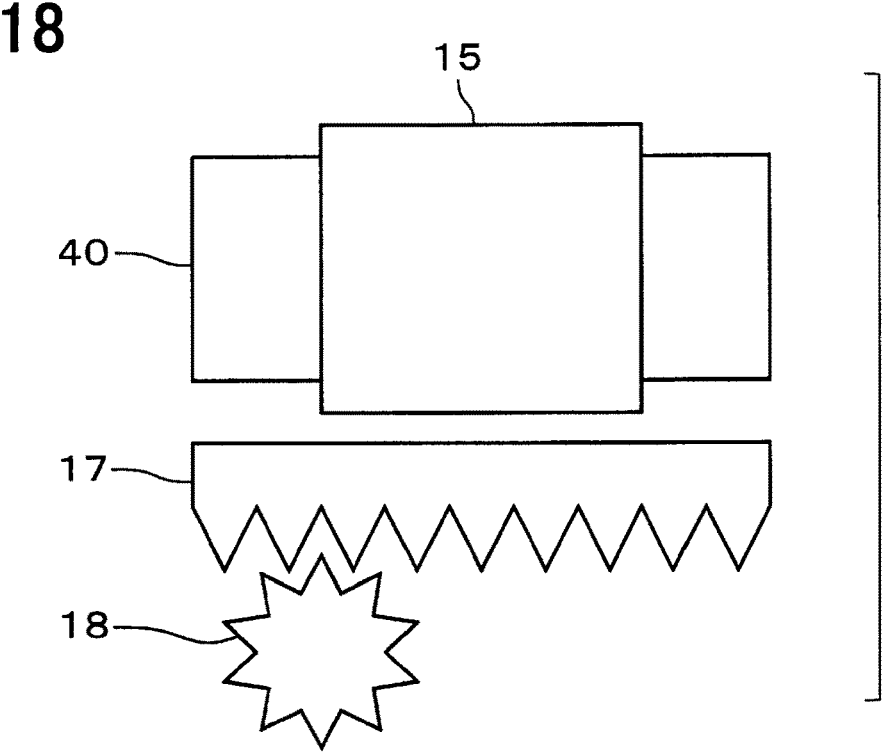
FIG. 18 is a schematic front view showing a configuration of a transport mechanism according to a third comparative example.
Figure 19:
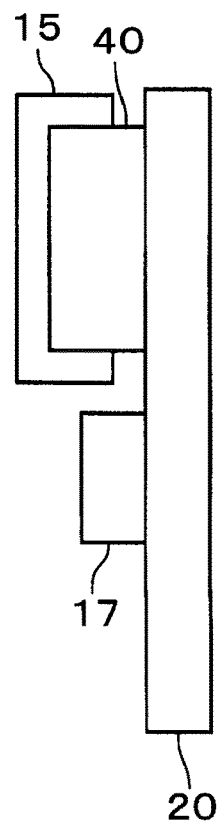
FIG. 19 is a schematic side view showing a configuration of a transport mechanism according to the third comparative example.

With such a configuration, it is possible to reduce the weight per one rail 3a, 3b. Therefore, it is possible to facilitate the installation work of the linear motion shaft 3 compared with a third comparative example shown in FIGS. 18 and 19, for example. In the third comparative example, the robot 6 is supported by one wide rail 40 having a width obtained by adding the widths of the rails 3a and 3b.

In the configuration of the present embodiment, the worker or the like lifts the linear motion shaft 3 in order to install it at a position away from the ground. Therefore, as the weight of the linear motion shaft 3, which is a part to be lifted, becomes heavier, the number of workers required for installation increases or the installation work needs to be performed using equipment with a large payload. As a result, the number of working steps and installation time may be increased.

According to the present embodiment, the linear motion shaft 3 is composed of the two rails 3a, 3b, that is, the linear motion shaft 3 is divided into the two rails 3a, 3b. Therefore, the weight of each part to be lifted during the installation work, that is, the weight of each rail 3a, 3b is reduced. As a result, workability is improved, and the number of workers required for the work can be reduced. Such effects are more beneficial as the moving distance of the mobile robot 2 (the length of the linear motion shaft 3) becomes longer, that is, as the mobile robot 2 is moved between more process areas 4.

In the present embodiment, the rail 3a is provided upward of the rack 17 and the pinion 18 in the vertical direction, and the rail 3b is provided downward of the rack 17 and the pinion 18 in the vertical direction. In the present embodiment, by adopting such arrangement, stable support equal to or higher than that of the third comparative example is realized, and as a result, generation of vibration during movement of the mobile robot 2 can be suppressed.

That is, in such a configuration, the stability of the support of the robot 6 does not depend on the width of the rail constituting the linear motion shaft, but depends on the distance between two points at which the slider is supported by the rails, that is, the distance between the upper end portion and the lower end portion of the rails in the vertical direction. Therefore, even if the widths of the two rails 3a and 3b are relatively narrow, stable support can be realized in the same degree as when the one relatively wide rail 40 is disposed. That is, the distance from the upper end portion of the rail 3a arranged on the upper side in the vertical direction to the lower end portion of the rail 3b arranged on the lower side in the vertical direction may be set to be the same as the width of the one relatively wide rail 40. Further, the slider 15 is supported by each of the two rails 3a and 3b. Accordingly, the support is provided at four points: the upper end portion and the lower end portion of the upper rail 3a; and the upper end portion and the lower end portion of the lower rail 3b, and thus the effect of further improving the stability of support can be obtained.

Figure 20:
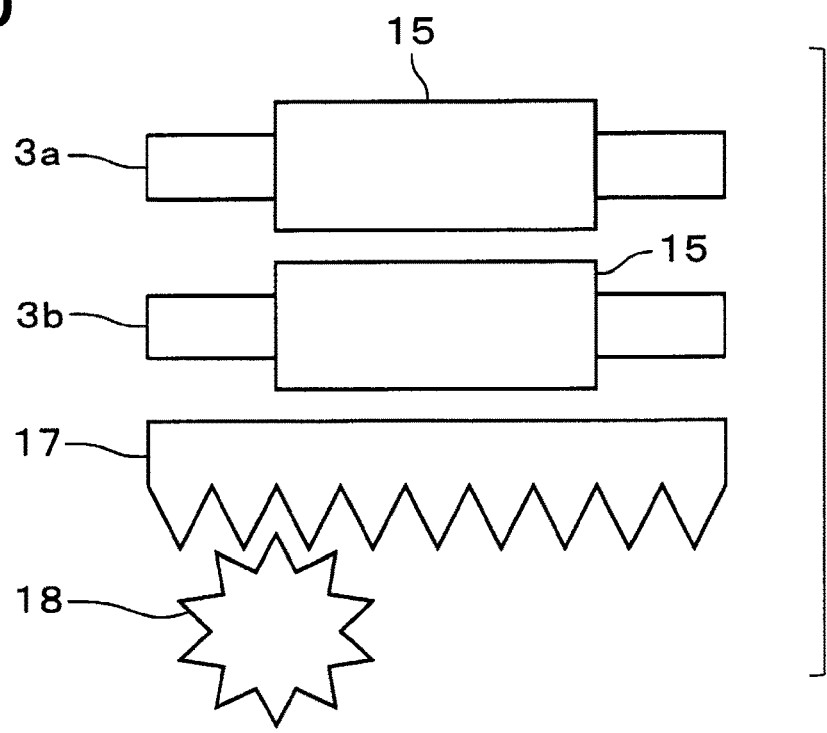
FIG. 20 is a schematic front view showing a configuration of a transport mechanism according to a fourth comparative example.
Figure 21:
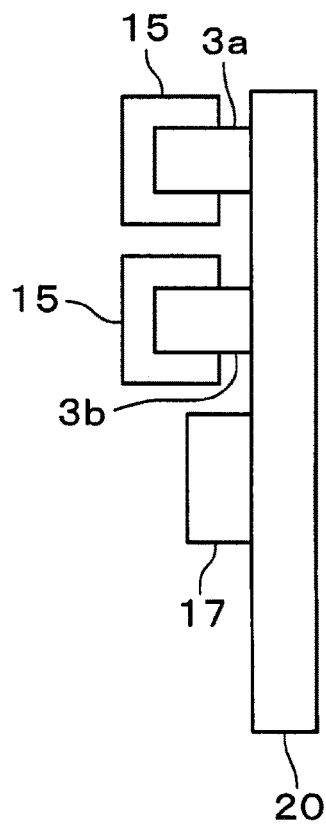
FIG. 21 is a schematic side view showing a configuration of a transport mechanism according to the fourth comparative example.

Further, according to the above-described arrangement, the following effects can be obtained. In a fourth comparative example shown in FIGS. 20 and 21, both of the two rails 3a and 3b are arranged next to each other upward of the rack 17 and the pinion 18, and thus, the distance from the slider 15 to the pinion 18 becomes longer as compared with the configuration of the present embodiment. Since the robot 6 is supported by the linear motion shaft 3 via the slider 15, when the robot 6 vibrates, the robot 6 swings around the slider 15 as a fulcrum. Hence, the degree of swing increases as the position is farther away from the fulcrum. Therefore, when the distance from the slider 15 to the pinion 18 is long, the swing of the pinion 18 at the time of vibration of the robot 6 becomes large. When the swing of the pinion 18 becomes large, the friction between the pinion 18 and the rack 17 becomes large, and in the worst case, a collision occurs, which may lead to wear and breakage of the pinion 18 and the rack 17.

On the other hand, when the two rails 3a and 3b are arranged separately in the vertical direction of the rack 17 and the pinion 18 as in the present embodiment, the distance from the two rails 3a and 3b to the pinion 18 is shorter than the configuration of the fourth comparative example in which the rails 3a and 3b are arranged next to each other. Therefore, the degree of swing of the pinion 18 at the time of vibration of the robot 6 is kept small, and as a result, the possibility of wear and breakage of the pinion 18 and the rack 17 can be reduced.

In this case, since the two rails 3a and 3b serve as two fulcrums, the rack 17 and the pinion 18 existing therebetween vibrate in a direction close to the horizontal direction. If they vibrate diagonally, oblique force is applied also to the teeth of the rack 17 and the pinion 18, so that they tend to wear (uneven wear) easily. However, if the vibration is close to horizontal, oblique force is difficult to apply. Therefore, according to the above configuration, the pinion 18 and the rack 17 are less likely to wear (uneven wear).

In the present embodiment, the rack 17 and the pinion 18 of the transport mechanism 16 are arranged so that their teeth are meshed with each other in the vertical direction. According to this arrangement, when the robot 6 vibrates, the rack 17 and the pinion 18 move in such a manner that the teeth of the rack 17 and the pinion 18 rub against each other in accordance with the vibration. However, the rack 17 and the pinion 18 do not act such that their teeth collide with each other. Therefore, according to the above configuration, it is possible to reliably prevent failure of the transport mechanism 16, such as the rack 17 and the pinion 18 being damaged due to the vibration of the robot 6.

In the present embodiment, the rack 17 of the transport mechanism 16 is arranged such that its teeth are oriented downward in the vertical direction. According to this arrangement, it is possible to prevent foreign matters such as dust and dirt from accumulating on the teeth of the rack 17. Therefore, according to the present embodiment, it is possible to prevent failure of the transport mechanism 16 due to the foreign matter bite between the rack 17 and the pinion 18.

In the present embodiment, the transport mechanism 16 is provided with the cover 31 that covers an upper side of the rack 17 in the vertical direction and continuously covers the side surface portion of the rack 17. If such a cover 31 is not provided, the entire surface of the rack 17 is exposed. Therefore, in a state where a hand of an operator or others is touching the rack 17, the mobile robot 2 may collide with the hand. In this case, the hand may be sandwiched between the mobile robot 2 and the rack 17, and there is a possibility that pain may occur in the hand due to rubbing with the irregularities of the surface of the rack 17. On the other hand, when the cover 31 is provided as in the configuration of the present embodiment, even if a similar case occurs, hands of workers or others is not rubbed by the irregularities of the surface of the rack 17, and the safety can be further enhanced.

OTHER EMBODIMENTS

It is to be noted that the present disclosure is not limited to the embodiments described above and illustrated in the drawings, and can be arbitrarily modified, combined, or expanded without departing from the scope thereof.

Numerical values and the like shown in the above embodiments are examples and are not limited thereto.

The walls 5 may be made of an opaque member such as wood as long as the deterioration of visibility or the like does not affect the safety.

The robot of the mobile robot 2 is not limited to the robot 6 having the two arms, and various robots such as a common horizontal articulated robot and a vertical articulated robot can be used.

The arrangement of the components of the mobile robot 2 are not limited to those shown in the above embodiment and can be appropriately changed.

The specific structure of the transport mechanism 16 is not limited to the configuration shown in the above embodiment and can be changed as appropriate.

The cover 31 covering the upper side of the rack 17 of the transport mechanism 16 in the vertical direction and continuously covering the side surface portion of the rack 17 may be provided as necessary.

According to an aspect of the present disclosure, a mobile robot includes a linear motion shaft, a movable body, a robot, a cover, an electric device unit, a transport mechanism, and an elevating mechanism. The linear motion shaft extends in an arrangement direction of process areas, and the movable body is linearly movable in a horizontal direction along the linear motion shaft. The robot includes: a base attached to the movable body and being movable in a vertical direction with respect to the movable body; a first arm having a proximal end part which is rotatable about a first vertical shaft and coupled to the base; and a first motor configured to generate a driving force to drive the first vertical shaft. The cover houses the robot therein and has an opening that faces the process areas. The electric device unit has electric components. The transport mechanism is configured to linearly move the movable body. The elevating mechanism is configured to perform an elevating operation to move the base in the vertical direction.

The robot is housed in the cover during moving between the process areas, and performs, in front of the process areas, a predetermined operation including an action to move an arm end toward the process areas through the opening. That is, the mobile robot has a configuration to change its form into a form similar to that of an unmanned conveyance vehicle during moving between the process areas, and into a form of a robot that performs work in front of the process areas.

In the above-described configuration, the transport mechanism is disposed downward of the robot in the vertical direction. In this way, the installability of the linear motion shaft is improved as compared with a configuration in which the transport mechanism is disposed upward of the robot in the vertical direction. This is because the linear motion shaft is installed so as to extend along the arrangement direction of the multiple process areas. Thus, the length of the linear motion shaft is relatively long, and the weight of the linear motion shaft is relatively heavy. In the configuration in which the transport mechanism is disposed upward of the robot, it is necessary to lift such a long and heavy linear motion shaft to the height higher than the robot, which may make installation work difficult. On the contrary, according to the configuration in which the transport mechanism is disposed downward of the robot as in the present embodiment, there is no need to lift the long and heavy linear motion shaft to the height higher than the robot. Thus, the installation work is facilitated, that is, the installability of the linear motion shaft is improved.

Further, with the above configuration, the total weight of the components other than the linear motion shaft, that is, the total weight of the movable body, the robot and the cover are also relatively heavy. In the above-described configuration in which the transport mechanism (linear motion shaft) is disposed upward of the robot, it is necessary to elevate the components other than the linear motion shaft, which may make installation work difficult. Further, in the case of the configuration in which the transport mechanism is disposed upward of the robot, it is desirable that the linear motion shaft be disposed at a much higher position in order to improve maintainability of equipment. Therefore, with the above configuration, installation work may become more difficult. On the other hand, in the case of the configuration in which the transport mechanism is disposed downward of the robot, it is desirable that the linear motion shaft be disposed at a much lower position in order to improve maintainability of equipment. Therefore, according to the above configuration, the installation work is further facilitated.

In the above configuration, the first motor is disposed such that the end part of the rotation shaft of the first motor faces downward in the vertical direction. In the environment where the robot works, there is a possibility that cutting oil or the like may splash. However, if the first motor is arranged as described above, risk of the cutting oil penetrating the first motor along the rotation shaft can be avoided. The electric device unit is disposed upward of the robot in the cover in the vertical direction. The cover includes the partition plate that separates the first housing space in which the electric device unit is housed and the second housing space in which the robot is housed. Accordingly, it is possible to prevent cutting oil or the like from entering the electric device unit and adversely affecting operation of electric parts.

Further, the partition plate has the protrusion protruding in the direction from the second housing space toward the first housing space. The protrusion provides the second housing space with the motor housing space capable of housing at least one part of the first motor. When the base moves up to the uppermost position in the vertical direction by the elevating operation, the at least one part of the first motor is hosed in the motor housing space. Accordingly, the height dimension of the mobile robot can be kept small while the height dimension including an amount of elevating movement, i.e. elevating stroke, which is equivalent to that of a configuration where the motor housing space is not provided. According to the above configuration, the degree of freedom of arrangement of these electric parts provided in the first housing space is extremely high as compared with mechanical parts having restrictions on arrangement. Therefore, according to the above-described configuration, it is possible to easily secure the above-described motor housing space.

The mobile robot of the above-described configuration is capable of reducing size in the height direction while realizing drip-proofness. Therefore, when the production system is configured using such mobile robot, the size thereof can be reduced. In addition, the mobile robot having the above configuration can be used in an environment requiring drip-proof specifications, for example, an environment where there is a possibility of cutting oil adhering to the mobile robot.

The mobile robot may have a configuration where the robot includes two arms. In this case, the robot may include a second arm having a proximal end part which is rotatable about a second vertical shaft and coupled to a distal end part of the first arm that is an end part of the first arm opposite the first vertical shaft. The second arm may have a distal end part as the arm end which is an end part of the second arm opposite the second vertical shaft. The robot may include a second motor configured to generate a driving force to drive the second vertical shaft, and a third motor configured to generate a driving force to rotate a tool attached to the arm end about a third vertical shaft. The second motor may be arranged such that a rotation shaft of the second motor faces downward in the vertical direction. The third motor may be arranged such that a rotation shaft of the third motor faces downward in the vertical direction.

In the above configuration, each of the second and third motors is disposed such that the rotation shafts face downward in the vertical direction. When the second and third motors are arranged as described above, similar to the first motor, risk of the cutting oil penetrating the second and third motors along the rotation shafts can be avoided. Therefore, also in the robot having two arms, the drip-proofness thereof can be realized.

According to the mobile robot, the robot may be configured to be housed in the cover in an arrangement state where the first arm and the second arm are folded to overlap each other in the vertical direction. The first arm may include a cutout portion in which a part of the third motor is housed in the arrangement state. With such a configuration, it is possible to further reduce the height dimension thereof without increasing the depth dimension of the mobile robot.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A mobile robot comprising:
   a linear motion shaft extending in an arrangement direction of process areas;
   a movable body linearly movable in a horizontal direction along the linear motion shaft;
   a robot including:
      a base attached to the movable body and being movable in a vertical direction with respect to the movable body;
      a first arm having a proximal end part which is rotatable about a first vertical shaft and coupled to the base; and
      a first motor configured to generate a driving force to drive the first vertical shaft;
   a cover housing the robot therein and having an opening that faces the process areas;
   an electric device unit having electric components;

a transport mechanism configured to linearly move the movable body; and an elevating mechanism configured to perform an elevating operation to move the base in the vertical direction, wherein the robot is housed in the cover during moving between the process areas, and performs, in front of the process areas, a predetermined operation including an action to move an arm end toward the process areas through the opening, the electric device unit is disposed inside the cover and upward of the robot in the vertical direction, the transport mechanism is disposed downward of the robot in the vertical direction, the first motor is arranged such that an end part of a rotation shaft of the first motor faces downward in the vertical direction, the cover includes a partition plate separating a first housing space in which the electric device unit is housed and a second housing space in which the robot is housed, the partition plate has a protrusion protruding in a direction from the second housing space toward the first housing space, the protrusion provides a motor housing space in the second housing space, the motor housing space being capable of housing therein at least one part of the first motor, and the at least one part of the first motor is housed in the motor housing space when the base is moved to an uppermost position in the vertical direction by the elevating operation.

2. The mobile robot according to claim 1, wherein the robot further includes:

a second arm having a proximal end part which is rotatable about a second vertical shaft and coupled to a distal end part of the first arm that is an end part of the first arm opposite the first vertical shaft, the second arm having a distal end part as the arm end which is an end part of the second arm opposite the second vertical shaft, a second motor configured to generate a driving force to drive the second vertical shaft, and a third motor configured to generate a driving force to rotate a tool attached to the arm end about a third vertical shaft, the second motor is arranged such that a rotation shaft of the second motor faces downward in the vertical direction, and the third motor is arranged such that a rotation shaft of the third motor faces downward in the vertical direction.

3. The mobile robot according to claim 2, wherein the robot is configured to be housed in the cover in an arrangement state where the first arm and the second arm are folded to overlap each other in the vertical direction, and the first arm includes a cutout portion in which a part of the third motor is housed in the arrangement state.

* * * * *